United States Patent [19]
Philpot et al.

[11] Patent Number: 5,763,820
[45] Date of Patent: Jun. 9, 1998

[54] WRAPPED GAS GENERANT CARTRIDGE

[75] Inventors: Paul T. Philpot, Layton; David W. Lindsey, Ogden; Scott A. Jackson, Centerville, all of Utah

[73] Assignee: Autiliv ASP, Inc., Ogden, Utah

[21] Appl. No.: 854,599

[22] Filed: May 12, 1997

Related U.S. Application Data

[63] Continuation-in-part of Ser. No. 586,184, Jan. 16, 1996, abandoned.

[51] Int. Cl.$^6$ .............................. F42B 5/00; B60R 21/26
[52] U.S. Cl. ........................ 102/531; 102/282; 102/430; 102/431; 102/464; 102/466; 280/741
[58] Field of Search ............................. 102/200, 202, 102/282, 285, 288, 289, 290, 322, 331, 430, 431, 433, 434, 443, 464–466, 530, 531, 700; 280/741

[56] References Cited

U.S. PATENT DOCUMENTS

| | | | |
|---|---|---|---|
| 1,682,639 | 8/1928 | Templeman | 102/331 |
| 1,864,905 | 6/1932 | Hill | 102/331 |
| 2,234,699 | 3/1941 | Huyett | 102/6 |
| 2,345,393 | 7/1944 | Schreib | 102/430 |
| 3,985,076 | 10/1976 | Schneiter et al. | 102/39 |
| 4,158,696 | 6/1979 | Wilhelm | 422/166 |
| 4,182,242 | 1/1980 | Mesia | 102/22 R |
| 4,656,948 | 4/1987 | Tsukiuda et al. | 102/452 |
| 4,719,859 | 1/1988 | Ballreich et al. | 102/444 |
| 4,872,408 | 10/1989 | Marz | 102/324 |
| 4,890,860 | 1/1990 | Schneiter | 280/741 |
| 4,919,897 | 4/1990 | Bender et al. | 422/165 |
| 5,062,367 | 11/1991 | Hayashi et al. | 102/530 |
| 5,269,224 | 12/1993 | Gonzales et al. | 102/288 |
| 5,306,041 | 4/1994 | Ogawa et al. | 280/741 |
| 5,351,619 | 10/1994 | Chan et al. | 102/289 |
| 5,398,966 | 3/1995 | Hock | 280/736 |
| 5,409,259 | 4/1995 | Cunningham et al. | 280/741 |
| 5,443,286 | 8/1995 | Cunningham et al. | 280/741 |
| 5,464,249 | 11/1995 | Lauritzen et al. | 280/741 |
| 5,468,016 | 11/1995 | Kobari et al. | 280/741 |
| 5,483,896 | 1/1996 | Hock et al. | 102/530 |
| 5,551,724 | 9/1996 | Armstrong, III et al. | 280/737 |
| 5,578,787 | 11/1996 | Kobari et al. | 102/288 |

FOREIGN PATENT DOCUMENTS

| | | | |
|---|---|---|---|
| 2130890 | 11/1972 | France | 102/290 |

*Primary Examiner*—Harold J. Tudor
*Attorney, Agent, or Firm*—George W. Rauchfuss, Jr.

[57] ABSTRACT

A wrapped gas generant cartridge is incorporated in an inflator of a vehicle occupant restraint system. The gas generant cartridge includes a stacked, aligned plurality of substantially flat annular wafers of gas generant material having a central opening therethrough. A wrap of sheet material surrounds the plurality of wafers and has marginal end panels folded along the end surfaces of the plurality of wafers, leaving at least one end opening exposed for receiving an ignition tube of the inflator. The wrap of sheet material is selected from metal foil, expanded metal, cellulose, thermoplastics, including polyolefin shrink wrap, with tape, adhesive or adhesive laminates holding the wrap in position. The gas generant cartridge is received in a filter and screen pack within the inflator.

20 Claims, 3 Drawing Sheets

WRAPPED GAS GENERANT CARTRIDGE

RELATED APPLICATION

This Application is a Continuation-In-Part of our application Ser. No. 08/586,184, filed Jan. 16, 1996 now abandoned.

FIELD OF INVENTION

The invention herein relates to a gas generant cartridge for use in inflating the airbag of a vehicle occupant restraint system, the cartridge having a plurality of wafers held together by an outer wrap.

BACKGROUND OF THE INVENTION

Vehicle occupant restraint systems require an inflator for producing gasses used to inflate the airbag. One general type of inflator for vehicle occupant restraint systems uses combustible gas generant to produce the inflation gasses.

In some instances, the combustible gas generant material is provided in flat annular wafers. Such wafers are advantageous because of their high surface-to-volume ratio, encouraging the rapid combustion necessary to produce inflation gasses quickly. The wafers are generally stacked and aligned to define a central opening, and are ignited along the peripheral edges of the wafers which define that central opening.

In Cunningham U.S. Pat. No. 5,443,286 and Hyashi U.S. Pat. No. 5,062,367, wafers are contained within a sealed cartridge. This permits storing, transporting and installing the wafers as a single unit, but requires that any material desired in the central opening, such as the ignition material utilized by Hyashi, must be placed in the opening at the time the cartridge is assembled and sealed. In Scheiter U.S. Pat. No. 4,890,860, a plurality of annular wafers are provided in an aligned stack supported and positioned by a surrounding screen and filter pack. The center of the aligned stack of wafers is open to receive igniter means, which are installed as the inflator is assembled. This construction requires that the wafers be transported in bulk to the area where the inflator is assembled, and be loaded into the inflator there.

Because of the highly combustible nature of the gas generant materials, their manufacture, handling, storage and transportation requires caution. Safety regulations often prohibit large amounts of the gas generant material to be kept in close proximity, in case of accidental ignition. Therefore, there are generally separate storage and staging areas, and sometimes even separate plants for the production and initial handling of the gas generant materials. Further, the gas generant materials are often brittle and are prone to breaking and flaking into dust, which compounds the problem of transporting them. Shipping the gas generant wafers in cartridges would minimize breaking and dusting from vibratory interaction of the wafers; however, it is also advantageous if additional ignition materials are not present during storage, handling and transportation, but can be added at the time of assembly.

SUMMARY OF INVENTION

A principal object of the invention herein is to provide gas generant wafers in a cartridge for use in the inflator of a vehicle occupant restraint system.

An additional object of the invention herein is to provide a cartridge of gas generant wafers which may be transported, stored and installed as a unit.

A further object of the invention herein is to minimize breaking and production of dust of gas generant wafers during shipping and handling.

Another object of the invention herein is to provide a cartridge of gas generant wafers which accepts an ignition system at the time of assembly into an inflator, i.e. the cartridge is of such a nature that during storage, handling or transportation thereof there are no additional ignition materials, i.e. pyrotechnic materials, present in addition to the wafers, and such ignition or pyrotechnic material is only to be added at the time of assembly of the cartridge into an inflator.

In accomplishing these and other objects of the invention herein, there is provided a gas generant cartridge for use in the inflator of a vehicle occupant restraint system, the gas generant cartridge comprising a stacked, aligned plurality of substantially flat annular wafers of gas generant material, each wafer having a center opening. The stacked, aligned plurality of gas generant wafers together define a cylindrical outer surface, a central opening, and annular end surfaces extending between the outer cylindrical surface and the central opening. The gas generant cartridge further comprises a wrap of pyrotechnic-free sheet material surrounding the cylindrical outer surface of the wafers and holding the wafers in alignment. The wrap of sheet material includes marginal edge portions respectively extending inwardly along the annular end surfaces of the plurality of gas generant wafers, to hold the wafers in a stack with the central opening exposed in at least one end thereof.

According to one aspect of the invention herein, the wrap of sheet material is a metal foil, including aluminum foil, expanded metal, a thermoplastic sheet including polyolefin shrink wrap, or a cellulose sheet. According to additional aspects of the invention, the wrap of sheet material is secured by crimping, by tape, by adhesive, including adhesive applied at the marginal edges, or adhesive carried on one surface of the wrap of sheet material.

The invention herein is further directed toward an inflator including a housing defining an outlet opening for delivery of inflation gasses and means supporting the wrapped gas generant cartridge of the foregoing type within the housing. The inflator further includes ignition means within the housing and positioned for igniting the gas generant wafers in the central openings thereof. In accordance with other aspects of the invention, the ignition means includes an ignition tube positioned within the central opening defined by the wrapped gas generant cartridge. According to further aspects of the invention, the wrapped gas generant cartridge is supported within the housing by a surrounding screen and filter pack.

The various features of novelty which characterize the invention are pointed out with particularity in the claims annexed to and forming part of this specification. For a fuller understanding of the invention, its operating advantages and specific objects attained by its use, reference is made to the accompanying drawings and descriptive matter in which the preferred embodiments are illustrated.

DRAWINGS

The same reference numerals refer to the same elements throughout the various figures.

DESCRIPTION OF PREFERRED EMBODIMENTS

Figure 1:
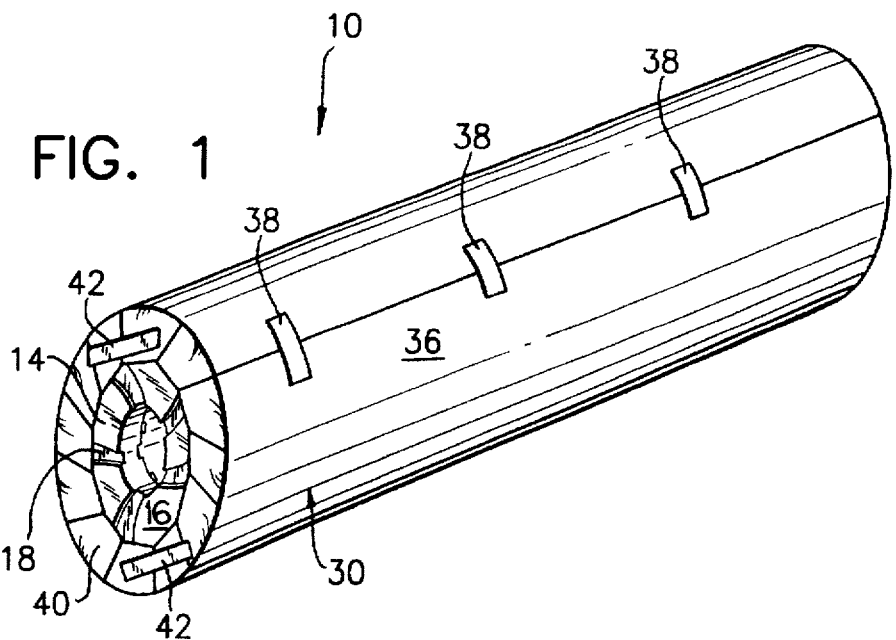
FIG. 1 is a perspective view of a wrapped gas generant cartridge, partially cut away, according to the invention herein.
Figure 2:
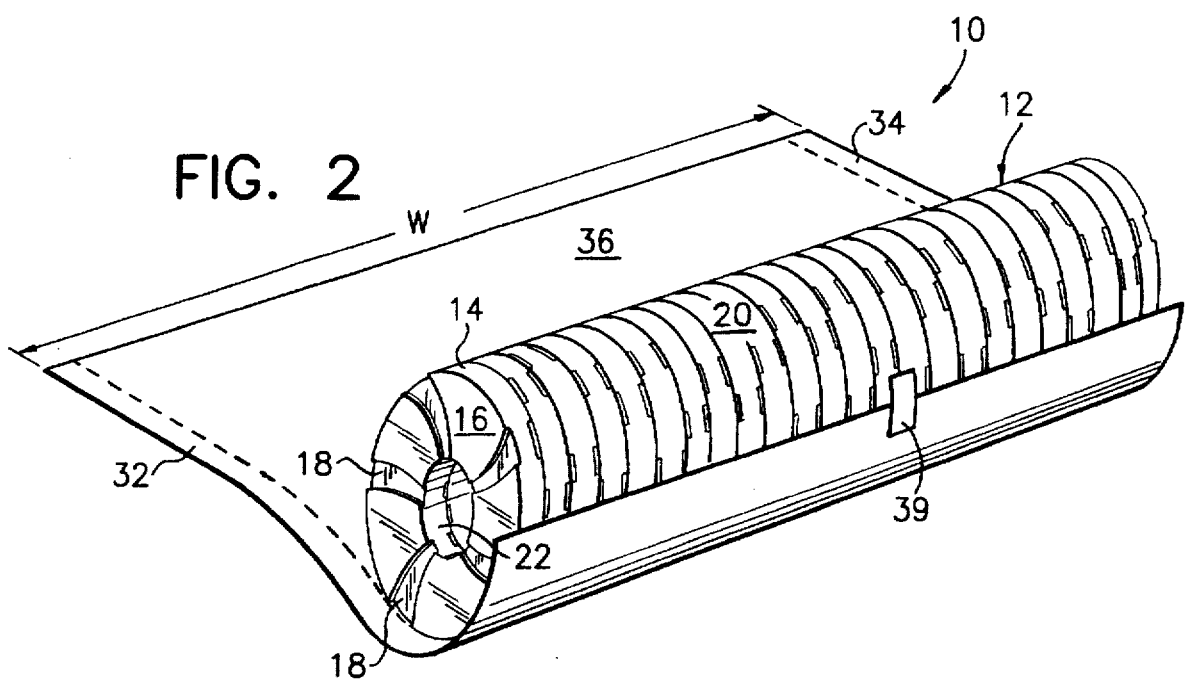
FIG. 2 is a perspective view of the wrapped gas generant cartridge of FIG. 1, shown partially wrapped.

The invention herein relates to a wrapped gas generant cartridge and further relates to an inflator incorporating a wrapped gas generant cartridge. With reference to FIGS. 1 and 2, a first wrapped generant cartridge 10 is shown. It generally comprises a stacked, aligned plurality of substantially flat annular wafers 12 of gas generant material. Each wafer has annular side faces extending from a circular central opening to an outer surface. The side faces are provided with radially extending arcuate slots which expose surface area of the wafer side faces even when stacked against an adjacent wafer, the exposed surface area providing for rapid ignition and combustion of the end wafer. Thus, the end wafer 14 seen in FIGS. 1 and 2 has an annular side face 16 which also provides the end face of the plurality of wafers 12, and end face 16 has arcuate slots 18.

The additional wafers of the plurality of wafers 12 are the same, wherein the stacked, aligned plurality of wafers form a cylindrical outer surface 20 and a central opening 22. The side face 16 of the end wafer 14 provides an annular end face of the stacked, aligned plurality of wafers 12, extending from the central opening 22 to the end of the outer surface 20. A similar annular end face is provided at the other end of the stacked, aligned plurality of wafers 12, although not seen in FIGS. 1 and 2.

The gas generant wafers are fabricated of combustible gas generant material, such as sodium azide in a binder. Although the annular wafers are typically circular, the term "annular" is meant to be construed broadly to encompass variations in the configuration of the outer surface and central opening.

The stacked, aligned plurality of wafers typically has a diameter of approximately 1.4", with the diameter of the center opening 22 being approximately 0.5". Thus, the width of the annular side face 16 is approximately 0.45". The stacked, aligned plurality of wafers may have any desired length, dictated by the number and thickness of individual wafers selected in accordance with the dimensions and desired performance of an inflator in which the wrapped gas generant cartridge 10 is used. By way of example, the length of the stacked, aligned plurality of wafers is typically in the range of approximately 4" to approximately 9½", and individual wafer thicknesses may be in the range of 0.100–0.250 inches.

The plurality of gas generant wafers is secured together in their stacked, aligned configuration by a wrap of pyrotechnic-free sheet material 30. The wrap of sheet material has a width W which is slightly greater than the length of the stacked, aligned plurality of wafers 12. When the stacked plurality of wafers 12 is centered on the wrap 30, two marginal edge panels 32 and 34 extend from the outer surface 20 of the stacked plurality of wafers 12. These are delineated by dotted lines in FIG. 2. A central portion 36 of the wrap 30 surrounds the outer surface 20 of the stacked plurality of wafers 12, overlaps itself, and is secured by two to three strips of tape 38. This maintains the plurality of wafers 12 in alignment. A strip of tape 39 secures one edge of the wrap 30 to the surface 20 to hold the sheet securely during wrapping. Tape 38 and tape 39 may be provided in single strips, respectively, along the entire width of the wrap 30.

The marginal edge panels 32 and 34 are folded inwardly against the outer portion of the annular side face 16 and are utilized to hold the plurality of wafers in their stacked condition, with the center opening 22 exposed. In the wrapped cartridge 10 illustrated in FIGS. 1 and 2, the wrap of sheet material is aluminum foil having a thickness of approximately 0.001", and the marginal edge 32 is deformed into a pleated band 40 which, by means of the strength and non-memory characteristics of the foil, serve to hold the plurality of wafers in the stacked condition. Expanded metal sheets with openings are also suitable as wrap material. The marginal edge 32, and hence the band 40 is on the order of 0.25" in the embodiment shown, and extends about half way across side face 16. If an exceptionally long stacked plurality of wafers is utilized, or if especially rough handling is anticipated, additional tape 42 may be applied at spaced apart locations to hold the crimps and therefore support the stack.

The other end is similarly secured. However, if it is anticipated that only one open end is desired for inserting ignition material into the wrapped gas generant cartridge 10, a wider marginal edge panel 34 may be provided and folded over most of the other end. It is preferable that both ends be open, so that there is no directional requirement in utilizing the cartridge 10.

Figure 3:
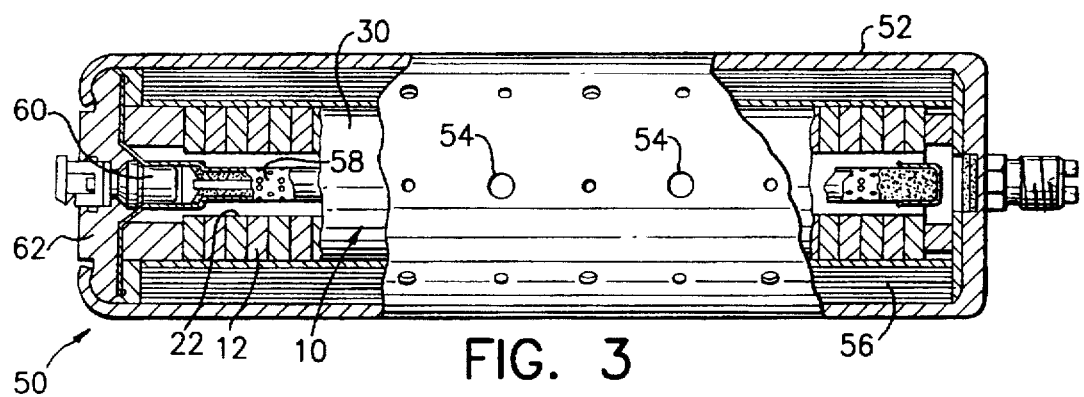
FIG. 3 is a longitudinal sectional view of an inflator incorporating a wrapped gas generant cartridge according to the invention herein.

With reference to FIG. 3, an inflator 50 incorporates the wrapped generant cartridge 10. The inflator 50 includes an elongated housing 52 defining outlet openings 54 for inflation gasses. The inflator 50 further comprises a tubular filter and screen pack 56 for filtering and cooling products of combustion as the gas generant material combusts.

The wrapped gas generant cartridge 10 is received in the filter and screen pack 56. The wrapped gas generant cartridge 10 may be transported to the site of assembly and loaded into the inflator 50 as a unit. The plurality of gas generant wafers 12 are protected against breakage and flaking by being held in a stacked, aligned position in a cartridge during handling and transporting. The open central passage 22 of the wrapped gas generant cartridge 10 accommodates an ignitor tube 58, which in turn is initiated by a squib 60 secured to an end wall 62 of the housing 52. It will be appreciated that wrapped gas generant cartridges may be used in different styles of inflators, including a short stack of wafers for a driver's side inflator.

Figure 4:
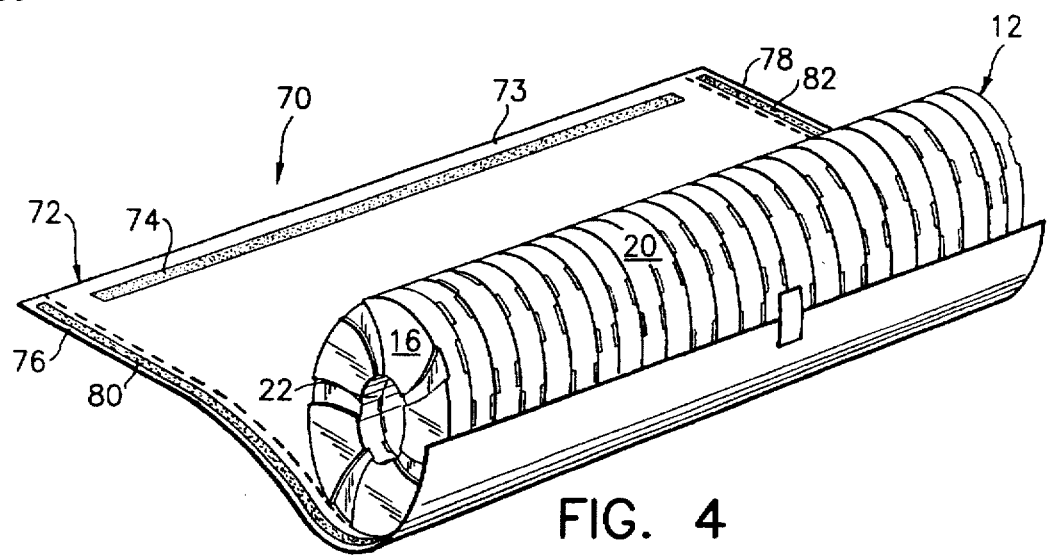
FIG. 4 is a perspective view of another wrapped gas generant cartridge according to the invention herein, shown partially wrapped.

With reference to FIG. 4, another wrapped gas generant cartridge 20 according to the invention herein is shown. It is similar to the wrapped gas generant cartridge 10 described above, having a stacked, aligned plurality of wafers 12 with an outer cylindrical surface 20, a central opening 22, and an annular end face 16 extending between the central opening 22 and the outer surface 20. The cartridge 70 further comprises a wrap of pyrotechnic-free sheet material 72 which overlaps when wrapped about the cylindrical surface 20 of the cartridge 70, and includes a strip of adhesive 74 adjacent edge 73 for securing the wrap of sheet material in overlapped, wrapped position. The wrap of sheet material 70 also has marginal edge panels 76 and 78, which are also provided with strips of adhesive material 80 and 82, respectively. When the marginal edge 76 is folded against the annular end face 16 of the plurality of stacked wafers 12, the adhesive 80 adheres both to the face and to adjacent folds or pleats of the wrap material, forming an end band holding the plurality of wafers in their stacked position. The use of strategically placed adhesive on the wrap of sheet material may be accomplished with a variety of different types of sheet material, including foils, plastics, papers and coated papers. The adhesive may be applied to the sheet material at the time of fabricating the cartridge, or may be an adhesive preapplied to the sheet material.

Figure 5:
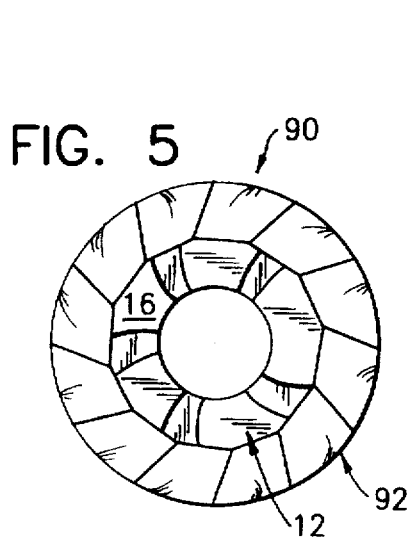
FIG. 5 is an end view of another wrapped gas generant cartridge according to the invention herein.
Figure 6:
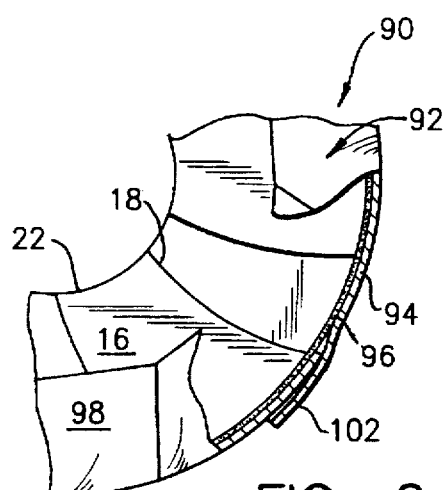
FIG. 6 is an enlarged fragmentary view of the wrapped gas generant cartridge of FIG. 5.

With reference to FIGS. 5 and 6, another wrapped gas generant cartridge 90 according to the invention herein is illustrated. It also includes a stacked, aligned plurality of gas generant wafers 12 having an outer cylindrical surface, a central opening 22 and an end face 16. A wrap of pyrotechnic-free sheet material 92 is applied around the plurality of wafers 12, in the same configuration as shown in the other wrapped cartridges described above. The sheet material 92 includes a substrate 94 and a layer of adhesive 96 applied substantially over the entire surface of the substrate 94. The wrap of sheet material 92 includes a marginal edge portion 98 on the end shown in the drawings, with the other end being similar. The adhesive 96 adheres to the outer cylindrical surface of the aligned stack of gas generant wafers 12 and also adheres to the substrate 94 of the wrap of sheet material at the overlap area 102, best seen in FIG. 6. The adhesive also adheres to the annular end faces and to the folded or pleated portions of the marginal edges folded to form the bands at the end faces, thereby holding the plurality of wafers in their aligned, stacked condition.

The substrate may be a foil, paper or thermoplastic film, such as polyethylene or polyester, covered by an adhesive.

Figure 7:
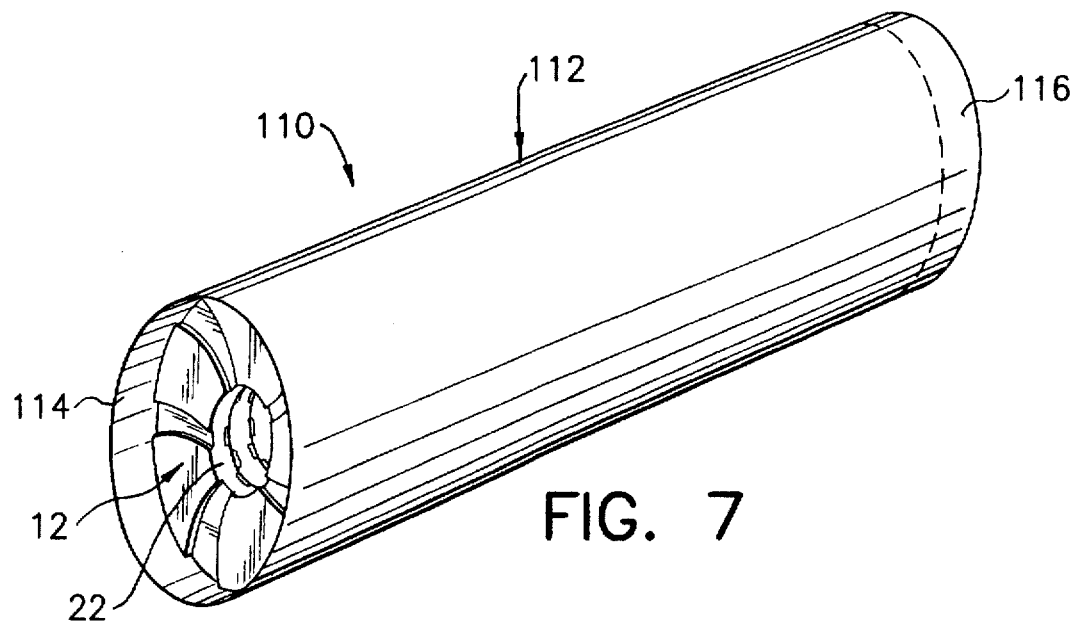
FIG. 7 is a perspective view of another wrapped gas generant cartridge according to the invention herein, shown partially wrapped.
Figure 8:
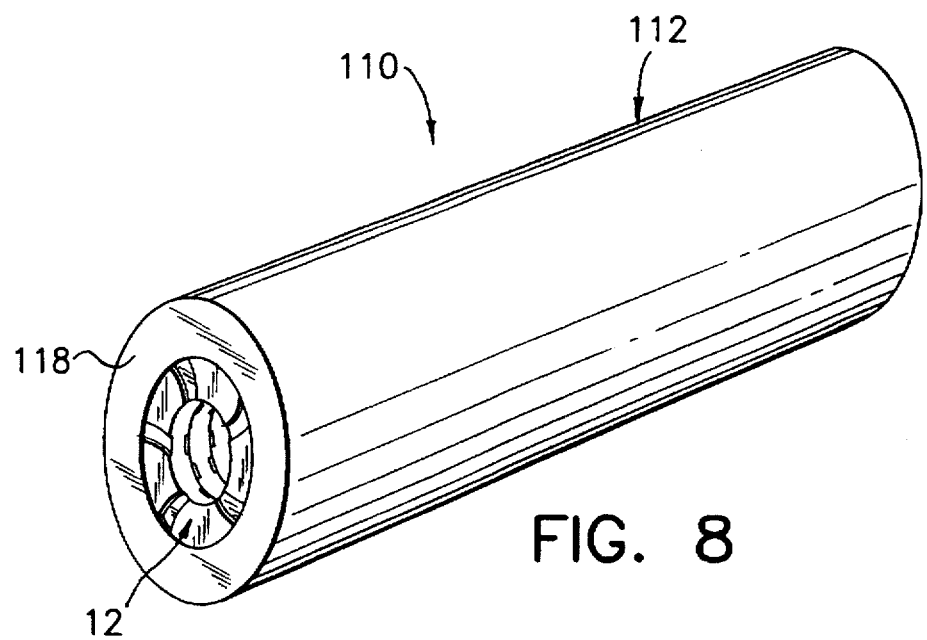
FIG. 8 is a perspective view of the wrapped gas generant cartridge of FIG. 7, fully wrapped.

With reference to FIGS. 7 and 8, another wrapped gas generant cartridge 110 is shown. It also includes a stacked, aligned plurality of annular gas generant wafers 12 with central opening 22. A wrap of pyrotechnic-free sheet material 112 is a tube of polyolefin shrink wrap, shown in FIG. 7 positioned over the plurality of wafers 12. Marginal end panels 114, 116 extend beyond the plurality of wafers 12. In FIG. 8, the marginal end panels 114, 116 are shown contracted, forming band 118 on the visible end of the gas generant cartridge 110, and leaving the central opening 22 exposed and open. This is achieved by the application of low heat, with care taken not to approach the auto ignition temperature of the gas generant.

In general, when using thermoplastic wrap material, it should be kept as thin as possible while maintaining structural integrity, in order to minimize any effects on initial delivery of inflation gas through the wrap and also to minimize extra products of combustion.

It will be appreciated that the wrapped gas generant cartridges 70, 90 and 110 may be utilized in an inflator in the same manner as described above with respect to the wrapped gas generant cartridge 10.

Accordingly, preferred embodiments of hybrid inflators have been described which admirably achieve the objects of the invention herein. With reference to the description of the preferred embodiments, those skilled in the art will appreciate that modifications may be made without departing from the spirit of the invention. Therefore, it is not intended that the scope of the invention be limited to the specific embodiments illustrated and described. Rather, it is intended that the scope of the invention be determined by the appended claims and equivalents thereof.

We claim:

1. A wrapped gas generant cartridge for handling and transporting thereof for installation at a later time in inflators for vehicle occupant restraint systems, the wrapped gas generant cartridge comprising:

A) a stacked aligned plurality of substantially flat annular wafers of gas generant material, each wafer having a center opening, wherein the, stacked aligned plurality of wafers has:
      1) a cylindrical outer surface,
      2) a central opening, and
      3) annular end faces extending between the ends of the cylindrical outer surface and the ends of the central opening, B) a pyrotechnic-free wrap of sheet material surrounding the cylindrical outer surface of the stacked, aligned plurality of wafers, the sheet material holding the wafers in alignment; and C) the wrap of sheet material having marginal end panels respectively extending inwardly from the ends of the cylindrical surface along only a portion of the annular end faces of the plurality of wafers, the marginal end panels holding the wafers in a stack so that the central opening is exposed in at least one end of the wrap for accepting an ignition system at the later time when the wrapped gas generant cartridge is assembled into the inflator.

2. A gas generant cartridge as defined in claim 1 wherein the wrap of sheet material is a metal foil surrounding the cylindrical outer surface of the stacked, aligned plurality of wafers and overlapping itself and defining an overlapping portion secured to itself for holding the wafers in alignment.

3. A gas generant cartridge as defined in claim 2 and further comprising at least one strip of tape securing the overlapping portion of the wrap of sheet material in position surrounding the cylindrical outer surface of the stacked, aligned plurality of wafers.

4. A gas generant cartridge as defined in claim 3 and further comprising a strip of tape securing a portion of the wrap of sheet material to the plurality of wafers.

5. A gas generant cartridge as defined in claim 2 wherein the marginal end panels of the metal foil are folded into overlapping pleats along the annular end faces of the plurality of wafers.

6. A gas generant cartridge as defined in claim 5 wherein the folded marginal end panels extend approximately halfway along the annular end faces of the plurality of wafers.

7. A gas generant cartridge as defined in claim 6 wherein the metal foil is aluminum.

8. A gas generant cartridge as defined in claim 2 and further comprising adhesive applied to the overlapping portion and marginal end panels of the metal foil wrap of sheet material for securing the sheet in wrapped condition with annular bands along the annular end faces of the plurality of wafers.

9. A gas generant cartridge as defined in claim 2 and further comprising adhesive applied over the surface of the metal foil wrap of sheet material surrounding the cylindrical outer surface of the plurality of wafers and folded inwardly into bands extending along the end faces of the plurality of wafers.

10. A gas generant cartridge as defined in claim 1 wherein the wrap of sheet material is thermoplastic.

11. A gas generant cartridge as defined in claim 10 wherein the thermoplastic is a polyolefin shrink wrap.

12. A gas generant cartridge as defined in claim 10 wherein the wrap of sheet material is a thermoplastic surrounding the cylindrical outer surface of the stacked, aligned plurality of wafers and overlapping itself and secured to itself for holding the wafers in alignment, with adhesive applied to the overlapping portion and marginal end panels, and having its marginal end panels folded inwardly along the annular end faces of the plurality of wafers for holding the wafers in a stack.

13. A gas generant cartridge as defined in claim 10 and further comprising adhesive applied over the surface of the thermoplastic wrap of sheet material surrounding the cylindrical outer surface of the plurality of wafers and folded inwardly along the end faces of the plurality of wafers.

14. A gas generant cartridge as defined in claim 10 wherein the wrap of sheet material is polyethylene.

15. A gas generant cartridge as defined in claim 10 wherein the wrap of sheet material is polyester.

16. A gas generant cartridge as defined in claim 1 wherein the wrapped sheet material is cellulose surrounding the cylindrical outer surface of the stacked, aligned plurality of wafers and overlapping itself and secured to itself for holding the wafers in alignment, and having its marginal end panels folded inwardly along the annular end faces of the plurality of wafers for holding the wafers in a stack.

17. An inflator for a vehicle occupant restraint system, the inflator comprising:

A) a housing defining an outlet opening for delivery of inflation gas;

B) a wrapped gas generant cartridge having a stacked aligned plurality of substantially flat, annular wafers of gas generant material, each wafer, having a center opening, wherein the stacked aligned plurality of wafers has:
1) a cylindrical outer surface,
2) a central opening, and
3) annular end faces extending between the ends of the cylindrical outer surface and the ends of the central opening;

C) a pyrotechnic-free wrap of non-perforated foil, film, paper or coated paper sheet material surrounding the cylindrical outer surface of the stacked, aligned plurality of wafers, the sheet material holding the wafers in alignment;

D) the wrap of sheet material having marginal end portions respectively extending inwardly from the ends of the cylindrical surface along only a portion of the annular end faces of the plurality of wafers, the marginal end portions holding the wafers in a stack so that the central opening is exposed in at least one end of the wrap;

E) means receiving and supporting the wrapped gas generant cartridge within the housing; and F) ignition means positioned in the inflator by means of the open end of the central opening of the wrapped generant cartridge for igniting the gas generant wafers in the central opening thereof.

18. An inflator as defined in claim 17 wherein the means receiving and supporting the wrapped gas generant cartridge in the housing is a tubular filter and screen park.

19. An inflator as defined in claim 17 wherein the ignition means is an ignition tube extending substantially through the central opening of the wrapped gas generant cartridge.

20. A gas generant cartridge as defined in claim 17 wherein the wrap of sheet material is a metal foil surrounding the cylindrical outer surface of the stacked, aligned plurality of wafers and overlapping itself and secured to itself for holding the wafers in alignment.

* * * * *